United States Patent
Teichmann et al.

(10) Patent No.: US 8,121,738 B2
(45) Date of Patent: Feb. 21, 2012

(54) METHOD AND APPARATUS FOR CONTROLLING WIND TURBINE ELECTRIC POWER GENERATION

(75) Inventors: Ralph Teichmann, Niskayuna, NY (US); Kathleen Ann O'Brien, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/869,522

(22) Filed: Aug. 26, 2010

(65) Prior Publication Data

US 2011/0144817 A1    Jun. 16, 2011

(51) Int. Cl.
*G05D 17/00* (2006.01)
*H02P 9/00* (2006.01)

(52) U.S. Cl. .......................................... 700/287; 290/44
(58) Field of Classification Search .................. 700/287, 700/297, 298; 290/44
See application file for complete search history.

(56) References Cited

U.S. PATENT DOCUMENTS

| | | | |
|---|---|---|---|
| 6,472,851 B2 | 10/2002 | Hammond | |
| 7,642,736 B2 | 1/2010 | Genkawa | |
| 2006/0273595 A1 | 12/2006 | Avagliano et al. | |
| 2009/0276170 A1 | 11/2009 | Bickel | |
| 2010/0094474 A1* | 4/2010 | Larsen et al. | 700/287 |
| 2010/0250012 A1* | 9/2010 | Arinaga et al. | 700/287 |
| 2010/0312409 A1 | 12/2010 | Zeumer et al. | |
| 2011/0187103 A1* | 8/2011 | Yasuga | 290/44 |

FOREIGN PATENT DOCUMENTS

| WO | 2006127844 A2 | 11/2006 |
|---|---|---|
| WO | 2009036895 A2 | 3/2009 |

OTHER PUBLICATIONS

Extended European search report for co-pending EP patent application No. EP 11176778 (7 pgs).

* cited by examiner

*Primary Examiner* — Albert Decady
*Assistant Examiner* — Steven Garland
(74) *Attorney, Agent, or Firm* — James McGinness, Esq.; Armstrong Teasdale LLP

(57) ABSTRACT

A method of controlling a wind turbine farm includes programming at least one algorithm within at least one processor. The wind turbine farm has at least one wind turbine that includes a generator. The at least one algorithm is representative of a relationship between at least one electric power grid tolerance range and an electric power generation rating. The method also includes determining the electric power grid tolerance range. The method further includes generating at least one wind turbine farm tolerance adjustment signal representative of a wind turbine farm tolerance range. The method also includes changing the wind turbine farm tolerance range.

20 Claims, 5 Drawing Sheets

METHOD AND APPARATUS FOR CONTROLLING WIND TURBINE ELECTRIC POWER GENERATION

BACKGROUND OF THE INVENTION

The subject matter described herein relates generally to wind turbines and, more particularly, to a method of controlling an electric power output of at least one wind turbine and/or a wind turbine farm.

Generally, a wind turbine includes a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on a base that includes a truss or tubular tower for example. At least some of the known wind turbines are physically nested together in a common geographical region to form a wind turbine farm. Such known wind turbine farms are typically electrically connected to an electrical grid.

Many known electrical grids have voltage tolerance ranges and require power factor tolerance ranges that facilitate reliable electric power transmission and distribution over a wide variety of operational conditions to serve a broad market. For example, many known electrical grids include a grid voltage tolerance range that extends from 90% of nominally rated voltage to 110% of nominally rated voltage. Also, for example, a typical electrical grid power factor tolerance range for generation equipment extends from a +0.9 power factor (pf) to a −0.9 pf. These operational tolerance ranges define the electrical parameters for all components connected to the grid including electric current rating and power draw at voltages in the lowest end of the voltage range and voltages at the highest end of the voltage range. Similarly, in at least some known wind turbine farms, each wind turbine has design, or nameplate parameters, that include power generation, current, voltage, and power factor tolerance ranges. Therefore, many known wind turbines are designed to operate within a voltage and power factor window that is complimentary to the associated electrical grid. However, during operation of such known wind turbines in such known electrical grids, to accommodate potential large voltage transients in the grid, wind turbines are operated below upper power and current parameters with sufficient margin to those upper parameters to tolerate such large grid-induced voltage transients in any direction. Therefore, electric power generation opportunities may not be realized by the known wind farms and other power generators connected to the grid may provide the electric power, thereby decreasing the operating effectiveness and efficiency of the wind farms and possibly incurring a lost economic opportunity for the owners/operators of the wind farms.

BRIEF DESCRIPTION OF THE INVENTION

In one aspect, a method of controlling a wind turbine farm is provided. The method includes programming at least one algorithm within at least one processor. The wind turbine farm has at least one wind turbine that includes a generator. The at least one algorithm is representative of a relationship between at least one electric power grid tolerance range and an electric power generation rating. The method also includes determining the electric power grid tolerance range. The method further includes generating at least one wind turbine farm tolerance adjustment signal representative of a wind turbine farm tolerance range. The method also includes changing the wind turbine farm tolerance range.

In another aspect, a wind turbine farm electrical control system is provided. The wind turbine farm electrical control system includes at least one wind turbine farm regulating device. The control system also includes at least one wind turbine farm control input device. The control system further includes at least one processor operatively coupled with the wind turbine farm regulating device and the wind turbine farm control input device. The processor is programmed with at least one algorithm representative of a relationship between at least one electric power grid tolerance range and an electric power generation rating. The processor is further programmed to generate at least one wind turbine farm tolerance adjustment signal representative of a wind turbine farm tolerance range.

In yet another aspect, a wind turbine farm is provided. The wind turbine farm includes a plurality of wind turbines. The wind turbine farm also includes a wind turbine farm electrical control system implemented in each wind turbine of the plurality of wind turbines. The wind turbine farm electrical control system includes at least one wind turbine farm regulating device. The control system also includes at least one wind turbine farm control input device. The control system further includes at least one processor operatively coupled to the regulating device and the wind turbine control input device. The processor is programmed with at least one algorithm representative of a relationship between at least one electric power grid tolerance range and an electric power generation rating. The processor is further programmed to generate at least one wind turbine farm tolerance adjustment signal representative of a wind turbine farm tolerance range.

DETAILED DESCRIPTION OF THE INVENTION

The embodiments described herein provide a control system for a wind turbine and a wind turbine farm. A wind turbine farm electrical control system is implemented. The control system is integrated within existing wind turbine and wind turbine farm hardware and software to measure and control wind turbine voltage and power factor tolerance ranges. In one embodiment, the control system dynamically determines electrical grid conditions and modifies operational tolerance ranges to facilitate maintaining the wind turbines in the wind turbine farm within predetermined parameters. In another embodiment, an electric grid management entity determines times when grid tolerance ranges are altered and transmits the times and the associated tolerance ranges to the wind turbine farm electrical control system. In yet another embodiment, individual wind turbines within the wind turbine farm receive modified operational tolerance ranges to facilitate maintaining the wind turbine within predetermined parameters. In a further embodiment, tolerance ranges for one or more wind turbines within a wind turbine farm are adjusted as a function of time based on agreements between the owners/operators of the grid and the wind turbine farm. Embodiments use existing hardware, such as sensors and processors, implementing the wind turbine farm electrical control system as described herein decrease capital costs of construction and operational costs associated with routine preventative and corrective maintenance.

A technical effect of the wind turbine farm electrical control system described herein is to adjust voltage and/or power factor tolerance ranges of at least one wind turbine in a wind turbine farm to facilitate more efficient and effective use of electric generation capacity therein. A further technical effect of the wind turbine farm electrical control system described herein includes narrowing voltage and/or power factor tolerance ranges and commensurately increasing electric power and current generation, while maintaining sufficient margins to power and current parameters to accommodate potential large voltage transients in the grid. A further technical effect of the control system as described herein is to facilitate realizing electric power generation opportunities for the owners/operators of he wind farms that may have not been realized with broader voltage and/or power factor tolerance ranges.

Figure 1:
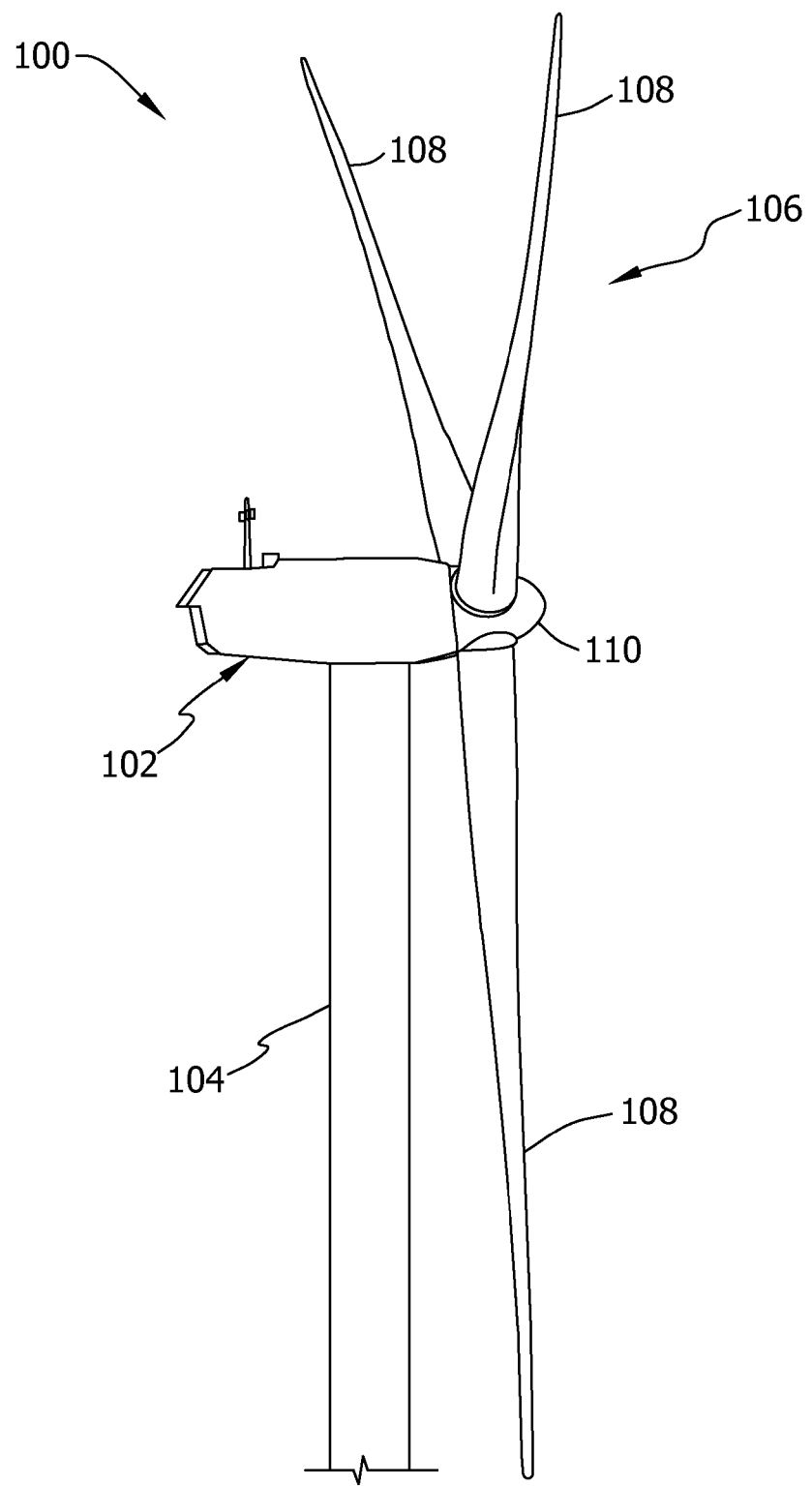
FIG. 1 is a schematic view of an exemplary wind turbine.

FIG. 1 is a schematic view of an exemplary wind turbine generator 100. Wind turbine generator 100 includes a nacelle 102 housing a generator (not shown in FIG. 1). Nacelle 102 is mounted on a tower 104 (a portion of tower 104 being shown in FIG. 1). Tower 104 may be any height that facilitates operation of wind turbine generator 100 as described herein. Wind turbine generator 100 also includes a rotor 106 that includes three rotor blades 108 attached to a rotating hub 110. Alternatively, wind turbine generator 100 includes any number of blades 108 that facilitates operation of wind turbine generator 100 as described herein. In the exemplary embodiment, wind turbine generator 100 includes a gearbox (not shown in FIG. 1) rotatably coupled to rotor 106 and a generator (not shown in FIG. 1).

Figure 2:
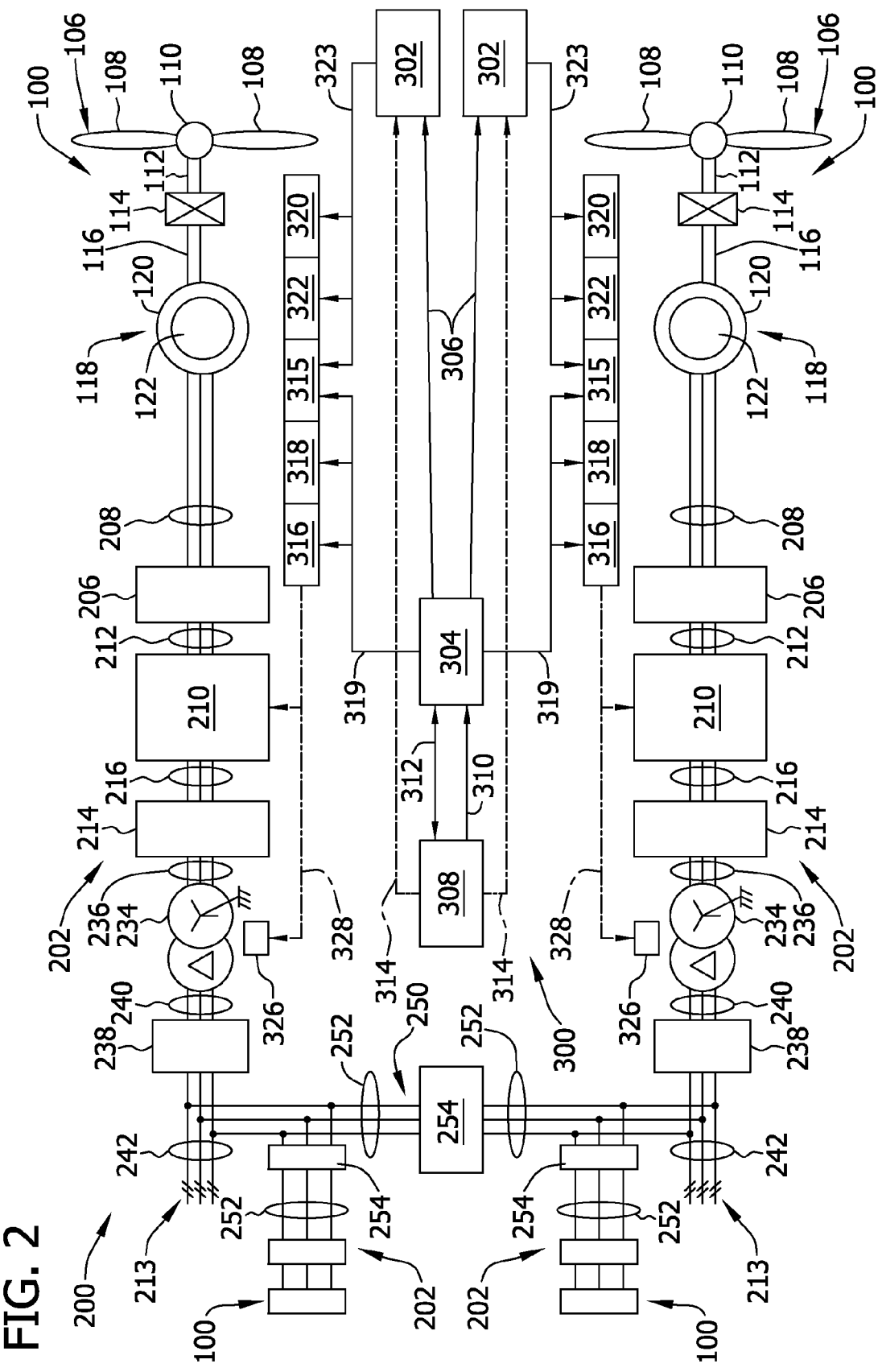
FIG. 2 is a schematic view of an exemplary wind turbine farm electrical control system that may be used with a wind turbine farm that includes the wind turbine shown in FIG. 1.

FIG. 2 is a schematic view of an exemplary wind turbine farm electrical control system 300 that may be used with wind turbine generator 100. In the exemplary embodiment, each wind turbine generator 100 is positioned within a wind turbine farm 200 that is at least partially defined geographically and/or electrically, i.e., farm 200 may be defined by a number of wind turbine generators 100 in a particular geographic area, or alternatively, defined by each wind turbine generator's 100 electrical connectivity to a common substation. In the exemplary embodiment, each wind turbine generator 100 that defines wind turbine farm 200 is substantially identical to each other wind turbine generator 100. Alternatively, any combination of any type of wind turbine generator is used that enables operation of wind turbine farm electrical control system 300 as described herein.

In the exemplary embodiment, rotor 106 includes a plurality of rotor blades 108 coupled to rotating hub 110. Rotor 106 also includes a low-speed shaft 112 rotatably coupled to hub 110. Low-speed shaft 112 is coupled to a step-up gearbox 114. Gearbox 114 is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a high-speed shaft 116 speed of approximately 1400 rpm. Alternatively, gearbox 114 has any step-up ratio that facilitates operation of wind turbine generator 100 as described herein. Wind turbine generator 100 may also include a direct-drive generator having a generator rotor (not shown in FIG. 1) that is rotatably coupled to rotor 106 without any intervening gearbox.

High-speed shaft 116 is rotatably coupled to a generator 118. In the exemplary embodiment, generator 118 is a synchronous permanent magnet generator (PMG) that includes a rotor 122 configured with a plurality of permanent magnets (not shown) and a stator 120 extending about rotor 122. Generator stator 120 is magnetically coupled to generator rotor 122. Alternatively, generator 118 is an electrically excited synchronous generator (EESG) that includes a rotor configured with a plurality of excitation windings (not shown) and a stator. Any generator that enables operation of wind turbine generator 100 as described herein may be used.

In the exemplary embodiment, each wind turbine generator 100 is electrically coupled to an electric power train 202. Electric power train 202 includes a stator synchronizing switch 206. Generator stator 120 is electrically coupled to stator synchronizing switch 206 via a stator bus 208. Stator bus 208 transmits three-phase power from stator 120 to switch 206. In the exemplary embodiment, electric power train 202 includes a full power conversion assembly 210. Synchronizing switch 206 is electrically coupled to full power conversion assembly 210 via a conversion bus 212 that transmits three-phase power from stator 120 to assembly 210. Full power conversion assembly 210 facilitates channeling electric power between stator 120 and an electric power transmission and distribution grid 213. Stator synchronizing switch 206 is electrically coupled to a main transformer circuit breaker 214 via a system bus 216.

Electric power train 202 further includes an electric power main transformer 234. System circuit breaker 214 is electrically coupled to electric power main transformer 234 via a generator-side bus 236. Main transformer 234 is electrically coupled to a grid circuit breaker 238 via a breaker-side bus 240. Grid breaker 238 is connected to electric power transmission and distribution grid 213 via a grid bus 242.

In the exemplary embodiment, a plurality of electric power trains 202 are electrically coupled to grid 213 via a wind turbine farm switchyard and/or substation 250. Substation 250 includes a plurality of substation buses 252 and at least one substation circuit breaker 254 to facilitate both electrical interconnection and electrical isolation of associated wind turbine generators 100 and electric power trains 202.

During operation, wind impacts blades 108 and blades 108 transform wind energy into a mechanical rotational torque that rotatingly drives low-speed shaft 112 via hub 110. Low-speed shaft 112 drives gearbox 114 that subsequently steps up the low rotational speed of shaft 112 to drive high-speed shaft 116 at an increased rotational speed. High speed shaft 116 rotatingly drives rotor 122. A rotating magnetic field is induced by rotor 122 and a voltage is induced within stator 120 that is magnetically coupled to rotor 122. Generator 118 converts the rotational mechanical energy to a sinusoidal, three-phase alternating current (AC) electrical energy signal in stator 120.

Further, during operation, electrical power generated within stator 120 is transmitted to full power conversion assembly 210. In the exemplary embodiment, electrical, three-phase, sinusoidal, AC power is generated within stator 120 and is transmitted to assembly 210 via bus 208, switch 206 and bus 212. Within assembly 210, the electrical power is rectified from sinusoidal, three-phase AC power to direct current (DC) power. The DC power is transmitted to an inverter (not shown) that converts the DC electrical power to three-phase, sinusoidal AC electrical power with pre-determined voltages, currents, and frequencies. Assembly 210 compensates or adjusts the frequency of the three-phase power from stator 120 for changes, for example, in the wind speed at hub 110 and blades 108. Therefore, in this manner, mechanical and electrical rotor frequencies are decoupled from stator frequency.

Moreover, in operation, the converted AC power is transmitted from conversion assembly 210 to main transformer 234 via bus 216, breaker 214 and bus 236. Main transformer 234 steps up the voltage amplitude of the electrical power and transformed electrical power is further transmitted to substation 250 and grid 213 via bus 240, circuit breaker 238, bus 242 and/or buses 252 and circuit breakers 254.

In the exemplary embodiment, wind turbine farm electrical control system 300 includes a plurality of turbine controllers 302. Each controller 302 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, a floppy disk, a compact disc-read only memory (CD-ROM), a magneto-optical disk (MOD), and/or a digital versatile disc (DVD) (none shown in FIG. 2) may also be used. Additional input channels (not shown in FIG. 2) may include, without limitation, computer peripherals associated with an operator interface such as a mouse and a keyboard (neither shown in FIG. 2). Alternatively, other computer peripherals may also be used that may include, for example, a scanner (not shown in FIG. 2). In the exemplary embodiment, additional output channels may include, without limitation, an operator interface monitor (not shown in FIG. 2).

Processors for each controller 302 process information transmitted from a plurality of electrical and electronic devices that may include, without limitation, voltage and current transducers (not shown). RAM and storage device store and transfer information and instructions to be executed by the processor. RAM and storage devices can also be used to store and provide temporary variables, static (i.e., non-changing) information and instructions, or other intermediate information to the processors during execution of instructions by the processors. Instructions that are executed include, without limitation, resident conversion and/or comparator algorithms. The execution of sequences of instructions is not limited to any specific combination of hardware circuitry and software instructions.

In the exemplary embodiment, each turbine controller 302 is configured to receive a plurality of voltage and electric current measurement signals (not shown) from voltage and electric current sensors (not shown). Such sensors may be coupled to any portion of electric power train 202, such as at least one of each of the three phases of bus 242 and/or system bus 216. Alternatively, voltage and electric current sensors are electrically coupled to any portion of electric power train 202 and/or switchyard 250 and/or grid 213 that facilitates operation of wind turbine farm electrical control system 300 as described herein. Alternatively, controller 302 is configured to receive any number of voltage and electric current measurement signals from any number of voltage and electric current sensors.

Each turbine controller 302 is configured to receive a plurality of voltage and electric current measurement signals (not shown) from voltage and electric current sensors (not shown) associated with associated full power conversion assembly 210, thereby facilitating control of converters 210. Alternatively, additional controllers coupled in communication with turbine controllers 302 facilitate control of converters 210. Moreover, in the exemplary embodiment, each controller 302 is configured to monitor and control at least some of the operational variables associated with wind turbine generator 100 including, without exception, at least one of generator field strength, shaft speeds, excitation voltage and current, total electric production of generator 118, bearing temperatures, and/or blade pitch.

In the exemplary embodiment, wind turbine farm electrical control system 300 includes a wind turbine farm controller 304 that is operatively coupled, such as communicatively coupled, to each turbine controller 302. Controller 304 is physically similar to controllers 302 and functionally similar to controllers 302 with the exception that each controller 302 controls the associated wind turbine generator 100 and electric power train 202 while, in contrast, controller 304 controls more than one wind turbine generator 100 and more than one electric power train 202. In the exemplary embodiment, controller 304 monitors and controls all of wind turbine generators 100 and electric power trains 202 in wind turbine farm 200 via a plurality of communication channels 306. Therefore, in a manner similar to that of controllers 302, controller 304 receives a plurality of voltage and current signals from each of the plurality of wind turbine generators 100, electric power trains 202, and substation 250.

Moreover, controller 304 and/or each controller 302 is operatively coupled to at least one wind turbine farm control input device 308. In the exemplary embodiment, device 308 is operated by an electric grid operator that includes, but is not limited to, an electric power utility. Further, device 308 is at least a portion of a Supervisory Control and Data Acquisition (SCADA) system (only device 308 shown).

Wind turbine farm electrical control system 300 includes at least one electrical grid command input channel 310 communicatively coupled to device 308 and controller 304. Device 308 functions as an electrical grid command device transmitting commands to wind turbine farm 200 and/or wind turbine generators 100. Wind turbine farm electrical control system 300 also includes at least one electrical grid monitoring input channel 312 communicatively coupled to device 308 and controller 304. Device 308 functions as an electrical grid/wind farm monitoring device to facilitate two-way communication between a grid operator and wind farm 200. Alternatively, wind turbine farm electrical control system 300 includes a plurality of monitoring and/or commanding input channels 314. Each channel 314 is operatively coupled to each turbine controller 302 and device 308.

In the exemplary embodiment, device 308 typically transmits signals via channel 310 that command wind turbine farm 200 and wind turbine generators 100 to operate within at least one of an electrical grid voltage tolerance range and an electrical grid power factor tolerance range. For example, an initial electrical grid voltage tolerance range of grid 213 is a range of grid voltage values that extends from 90% of nominally rated grid voltage to 110% of nominally rated grid voltage. Also, for example, an initial electrical grid power factor tolerance range of grid 213 is a range of grid power factor values that extends from a +0.9 power factor (pf) to a −0.9 pf. The positive sign "+" is indicative of a lagging power factor and the negative sign "−" is indicative of a leading power factor. Further, in the exemplary embodiment, such electrical grid voltage and power factor tolerance range signals are received by wind turbine farm controller 304 and transmitted to wind turbine controllers 302 thereafter. Alternatively, the tolerance range signals are transmitted directly to controllers 302.

Wind turbine farm electrical control system 300 also includes at least one wind turbine regulating device. In one embodiment, wind turbine regulating device includes at least one of a wind turbine electric power generation regulator 315, a wind turbine farm voltage tolerance regulator 316, a wind turbine farm power factor tolerance regulator 318, at least one wind turbine voltage tolerance regulator 320, and at least one wind turbine power factor tolerance regulator 322. Each of regulators 315, 316, and 318 are operatively coupled to wind farm controller 304 via a farm control channel 319. Each of regulators 315, 320, and 322 are operatively coupled to wind turbine controller 302 via a turbine control channel 323. In the exemplary embodiment, regulator 315 is an electric power generation regulator. Alternatively, regulator 315 is a wind turbine electric current regulator. Electric power generation and generated current are directly related.

In the exemplary embodiment, each of regulators 316 and 318 is programmed within the processors of wind farm controller 304. Also, in the exemplary embodiment, each of regulators 320 and 322 is programmed within the processors of wind turbine controllers 302. Further, in the exemplary embodiment, regulator 315 is programmed within the processors of both controller 302 and controller 304, wherein controller 304 is given priority over controller 302. Controllers 302 and 304 are programmed with at least one algorithm representative of a relationship between at least one electric power grid tolerance range and an electric power generation rating, such as, an upper generation parameter.

Wind turbine electric power generation regulator 315 is operatively coupled to power generation regulation devices of associated wind turbine generator 100. Signals transmitted from regulator 315 modulate operational values that may include, without limitation, a generator field strength. Modulating power generation facilitates modulating generated current.

In the exemplary embodiment, each of regulators 315, 316, 318, 320, and 322 is programmed with at least one algorithm representative of a relationship between at least one electric power grid tolerance range and an electric power generation rating. Further, each of regulators 315, 316, 318, 320, and 322 is programmed with at least one algorithm to generate at least one wind turbine farm tolerance adjustment signal representative of a wind turbine farm tolerance range. More specifically, each of wind turbine electric power generation regulator 315, wind turbine farm voltage tolerance regulator 316, wind turbine farm power factor tolerance regulator 318, wind turbine voltage tolerance regulator 320, and wind turbine power factor tolerance regulator 322 includes sufficient programming, including algorithms, to facilitate establishing electric power generation parameters based on electrical grid voltage and power factor tolerance range signals received by wind turbine farm controller 304 and/or wind turbine controllers 302 from wind turbine farm control input device 308.

Figure 3:
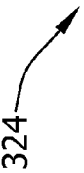
FIG. 3 is an exemplary table of parameters for the wind turbine farm electrical control system shown in FIG. 2.

FIG. 3 is an exemplary table of parameters 324 for the wind turbine farm electrical control system shown in FIG. 2. Table 324 shows an electric power generation parameter as a percent (%) value of a nominal power rating for a predefined voltage tolerance range and a predefined power factor tolerance range. Table 324 shows an electric power generation parameter for grid voltage values that extend from a variation of 1% from a nominal voltage rating to a 10% variation from the nominal voltage rating, i.e., from 90% to 110% of nominally rated grid voltage. Table 324 also shows an electric power generation parameter for grid power factor values that extend from a power factor of ±0.9 pf to a power factor of unity.

For example, at a commanded grid voltage tolerance range of ±10% (equivalent to the nominal voltage range) and a commanded grid power factor tolerance range of ±0.9 pf (equivalent to the nominal power factor range), the associated upper parameter for electric power generation is 100% of the nominal rating. Therefore, if the grid operator requires the broadest range of voltage and power factor tolerance ranges for the broadest range of electrically connected equipment throughout grid 213 (shown in FIG. 2), each wind turbine generator 100 within wind turbine farm 200 (both shown in FIG. 2) is limited to 100% of rated power generation. The upper electric power generation parameter of 100% is established by system 200. In one embodiment, system 200 generates an upper electric power generation parameter signal that is representative of 100% of rated generation.

Also, for example, if the grid operator has determined that a more narrow range of electrically connected equipment is connected to grid 213, the grid operator may command wind turbine farm 200 and associated wind turbine generators 100 to operate within narrower voltage and/or power factor tolerance ranges. Specifically, when the commanded power factor tolerance range is narrowed to ±0.95 pf and the commanded grid voltage tolerance range of ±10% is maintained, the upper parameter for power generation is increased by 6% to 106% of nominal rated power generation. The upper electric power generation parameter of 106% is established by system 200. Specifically, system 200 generates an upper electric power generation parameter signal that is representative of 106% of rated generation.

Further, if the commanded grid voltage tolerance range is also narrowed to ±5% while the commanded power factor tolerance range is maintained at ±0.9 pf, the upper parameter for power generation is increased by 5% to 105% of nominal rated power generation. The upper electric power generation parameter of 105% is established by system 200. Specifically, system 200 generates an upper electric power generation parameter signal that is representative of 105% of rated generation.

Further, if the commanded power factor tolerance range is narrowed to ±0.95 pf and the commanded grid voltage tolerance range is also narrowed to ±5%, the upper parameter for power generation is increased by 11% to 111% of nominal rated power generation. The upper electric power generation parameter of 111% is established by system 200. Specifically, system 200 generates an upper electric power generation parameter signal that is representative of 111% of rated generation.

Moreover, if the commanded power factor tolerance range is narrowed to a unity power factor and the commanded grid voltage tolerance range is also narrowed to ±1%, the upper parameter for power generation is increased by 21% to 121% of nominal rated power generation.

In general, for every 1% narrowing of the commanded grid power factor tolerance range, an increase of approximately 1% of the upper parameter for power generation from each wind turbine generator 100 is attained. Similarly, for every 1% narrowing of the commanded grid voltage tolerance range, an increase of approximately 1% of the upper parameter for power generation from each wind turbine generator 100 is attained.

Voltage, power factor, and power generation parameters in wind turbine farm 200 may be modulated as a function of conditions on grid 213. Moreover, such modulation may be executed as a function of time. For example, a grid operator may adjust the voltage and power factor for a temporary period of time or indefinitely. If the grid operator narrows the voltage and/or power factor tolerance ranges permanently, the wind turbine farm operator may increase the power generation ratings of the associated wind turbine generators 100.

Moreover, a grid operator may modulate grid voltage as a function of grid conditions during which the grid operator may temporarily command a voltage tolerance range that exceeds nominal voltage ratings of wind turbine generators 100. Therefore, a wind farm operator may adjust a voltage of wind turbine farm 200 below the nominal voltage, thereby linearly expanding an overvoltage margin. Under such conditions, a lower power generation value than nominally rated power may be accepted for the duration of the operation at depressed voltages.

The upper power generation parameters defined in table 324 are based on operational parameters associated with wind turbine generators 100. Such operational parameters include, without limitation, torques on shafts 112 and 116 (both shown in FIG. 2), temperatures of generator stator 120 and rotor 122 (both shown in FIG. 2), power electronics (not shown) within full power conversion assembly 210 (shown in FIG. 2) and turbulence conditions and ambient temperatures within wind turbine farm 200.

Referring again to FIG. 2, wind turbine farm electrical control system 300 includes another wind turbine farm regulating device, i.e., at least one wind turbine transformer tap changer 326. In the exemplary embodiment, tap changer 326 is a motorized, controllable, on-load tap changer (OLTC) coupled to main transformer 234. In the exemplary embodiment, tap changer 326 is operatively coupled to regulators 316, 318, 320, and 322 via an adjustment input channel 328 and changes a tap setting as a function of signals received from at least one of regulators 316, 318, 320, and 322, thereby changing a secondary voltage and/or power factor induced on breaker-side bus 240. Each tap setting within transformer 234 is determined based on voltage settings as shown in table 324 (shown in FIG. 3). Moreover, full power conversion assembly 210 is operatively coupled to regulators 316, 318, 320, and 322 via input channel 328 and changes at least one setting of assembly 210 as a function of signals received from at least one of regulators 316, 318, 320, and 322, thereby changing a voltage and/or power factor induced on system bus 216.

In the exemplary embodiment, the grid voltage tolerance range and the grid power factor tolerance range are closely related and facilitate determining the voltage at wind turbine farm 200. Therefore, such tolerance ranges also facilitate determining overvoltage and undervoltage trip device (not shown) settings for each wind turbine generator 100. A typical response of tap changer 326 is approximately 10 seconds per each incremental tap change of ±2%. Therefore, in the exemplary embodiment, within one minute of receipt of a tap change signal from one of regulators 316, 318, 320, and/or 322, the voltage of farm 200 and wind turbine generators 100 can be adjusted as a function of a change in either the voltage and/or power factor tolerance band. If a more rapid response is desired, a static transfer switch (not shown) may be used to facilitate executing tap changes within a few cycles.

Figure 4:
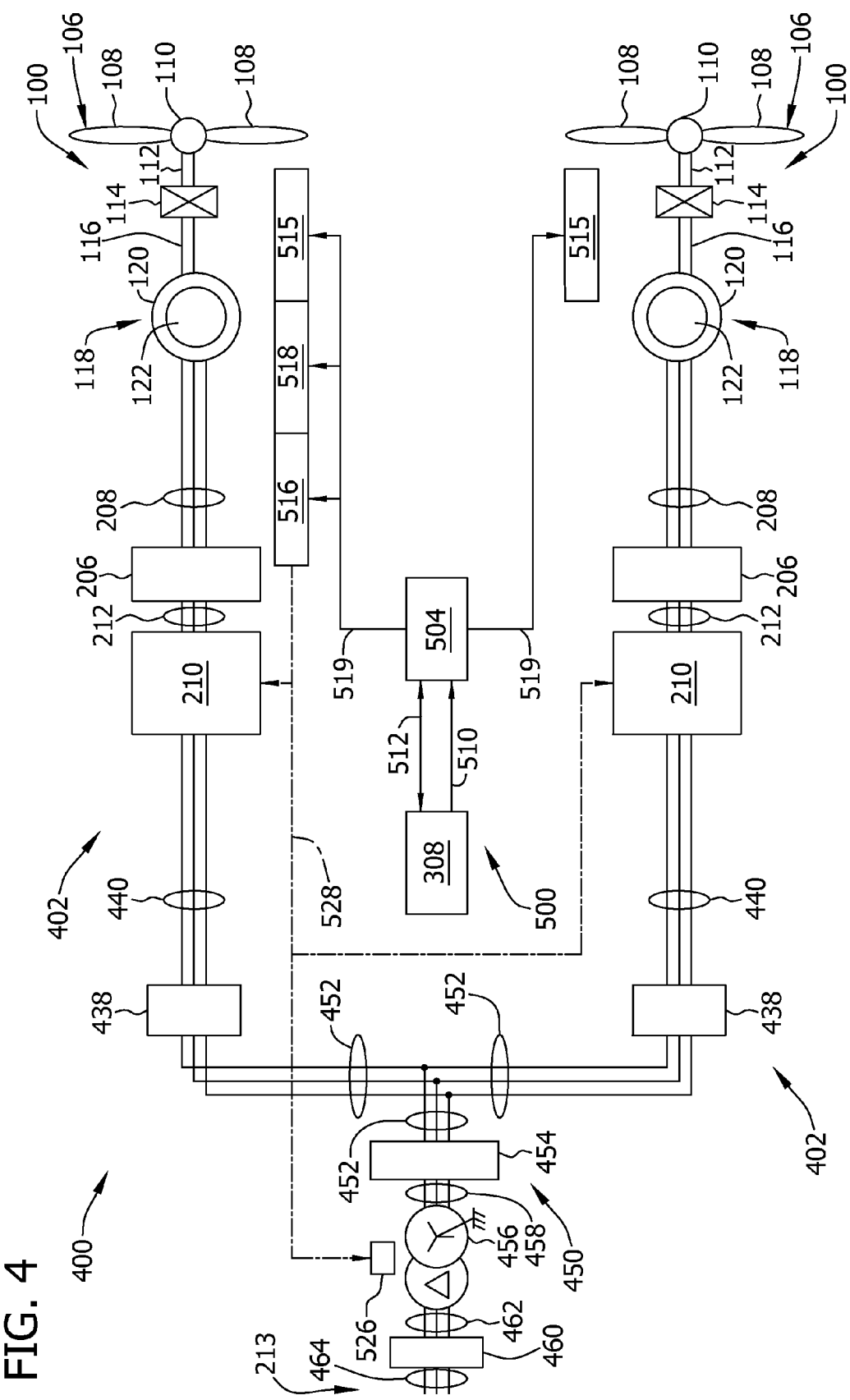
FIG. 4 is a schematic view of another exemplary wind turbine farm electrical control system that may be used with a wind turbine farm that includes the wind turbine shown in FIG. 1.

FIG. 4 is a schematic view of another exemplary wind turbine farm electrical control system 500 that may be used with a wind turbine farm 400 that includes wind turbine generator 100. Wind turbine farm 400 includes a plurality of wind turbine generators 100 (only two shown in FIG. 4). In this alternative exemplary embodiment, each wind turbine generator 100 is electrically coupled to an electric power train 402. Electric power train 402 is similar to electric power train 202 (shown in FIG. 2) and includes stator synchronizing switch 206, stator bus 208, full power conversion assembly 210, and conversion bus 212. However, power train 402 differs from power train 202 in that power train 402 does not include a main transformer. Instead, electric power train 402 includes a substation circuit breaker 438 coupled to assembly 210 via a breaker-side bus 440. A plurality of electric power trains 402 are electrically coupled to a wind turbine farm switchyard and/or substation 450. Substation 450 includes a plurality of substation buses 452 and at least one substation circuit breaker 454 to facilitate both electrical interconnection and electrical isolation of wind turbine farm 400 from grid 213.

Electric power train 402 further includes a wind turbine farm transformer 456. Substation circuit breaker 454 is electrically coupled to electric power main transformer 456 via a generator-side bus 458. Main transformer 456 is electrically coupled to a grid circuit breaker 460 via a breaker-side bus 462. Grid breaker 460 is connected to electric power transmission and distribution grid 213 via a grid bus 464.

In this alternative exemplary embodiment, wind turbine farm electrical control system 500 includes a wind turbine farm controller 504 that is functionally similar to controller 304 (shown in FIG. 2). Individual control of wind turbine generators is performed with independent controllers (not shown in FIG. 4) that may or may not receive feedforward and/or feedback signals from controller 504. Controller 504 is operatively coupled to wind turbine farm control input device 308. Wind turbine farm electrical control system 500 also includes electrical grid command input channel 510 and electrical grid monitoring input channel 512 communicatively coupled to device 308 and controller 504. Channels 510 and 512 are substantially similar to channels 310 and 312, respectively (both shown in FIG. 2).

Wind turbine farm electrical control system 500 also includes at least one wind turbine regulating device, or more specifically, at least one of a plurality of wind turbine electric power generation regulators 515, a wind turbine farm voltage tolerance regulator 516, and a wind turbine farm power factor tolerance regulator 518. Each of regulators 515, 516, and 518 are communicatively and operatively coupled to wind farm controller 504 via a farm control channel 519. Moreover, regulators 515, 516, and 518 are substantially similar to regulators 315, 316, and 318, respectively (all shown in FIG. 2). In this alternative exemplary embodiment, regulator 515 is an electric power generation regulator. Alternatively, regulator 515 is a wind turbine electric current regulator, wherein electric power generation and generated current are directly related.

Wind turbine farm electrical control system 500 further includes at least one wind turbine farm transformer tap changer 526 that is substantially similar to tap changer 326 (shown in FIG. 2). Tap changer 526 is operatively coupled to regulators 516 and 518 via an adjustment input channel 528 that is substantially similar to channel 328 (shown in FIG. 2). Moreover, full power conversion assembly 210 is operatively coupled to regulators 516 and 518 via input channel 528 and changes at least one setting of assembly 210 as a function of signals received from at least one of regulators 516 and 518, thereby changing a voltage and/or power factor induced on breaker-side bus 440. Operation of wind turbine farm electrical control system 500 is similar to operation of system 300 with reference to table 324 (shown in FIG. 3).

Figure 5:
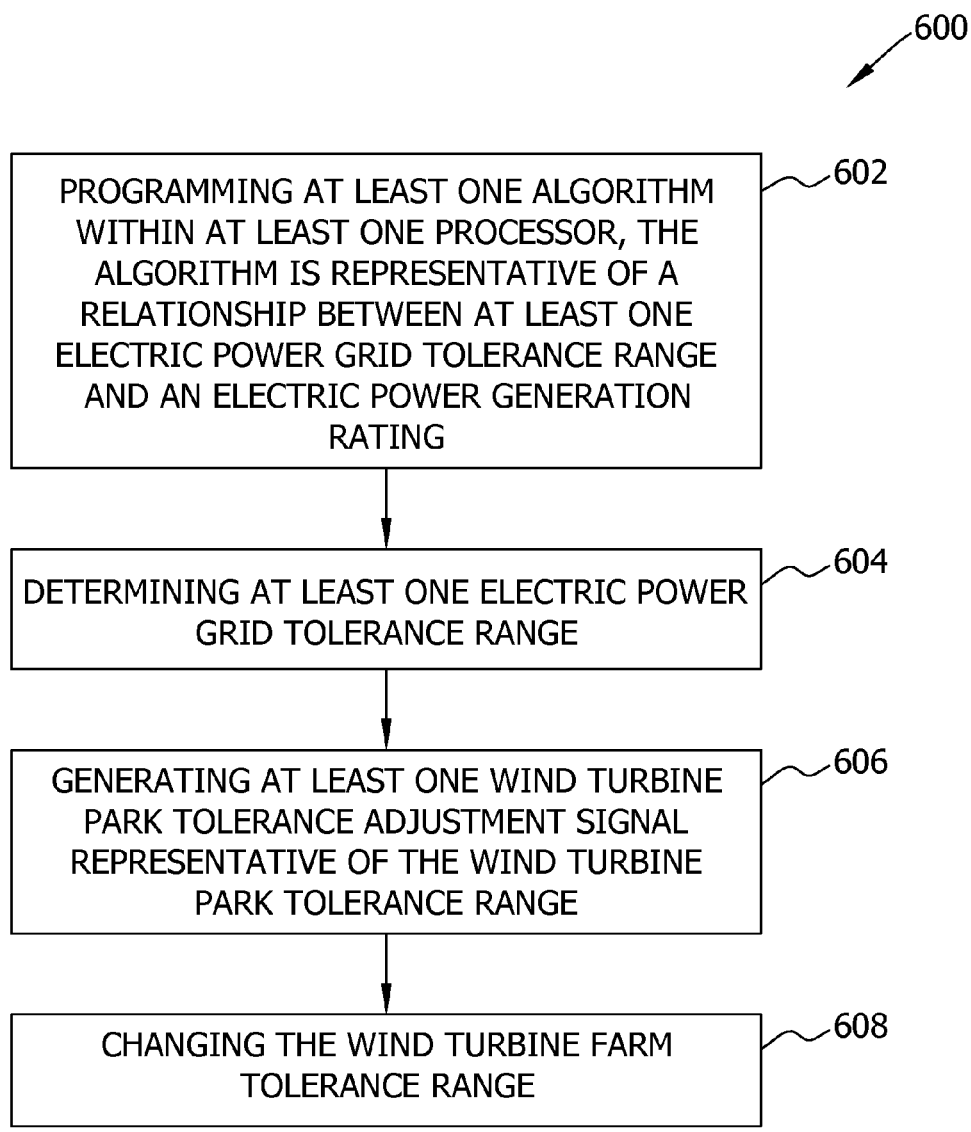
FIG. 5 is a flow diagram of an exemplary method of operating the wind turbine farm electrical control system that may be used with the wind turbine farm shown in FIGS. 2 and 3.

FIG. 5 is a flow diagram of an exemplary method 600 of operating the wind turbine farm electrical control systems 300 and 500 (shown in FIGS. 2 and 4) that may be used with the wind turbine farms 200 (shown in FIG. 2) and 400 (shown in FIG. 4). In the exemplary embodiment, at least one algorithm is programmed 602 within at least one processor within controllers 302 and 304 (both shown in FIG. 2), and 504 (shown in FIG. 4). The algorithm is representative of a relationship between at least one electric power grid tolerance range and an electric power generation rating. At least one electric power grid tolerance range is determined 604 and at least one wind turbine farm tolerance adjustment signal representative of the wind turbine farm tolerance range is generated 606. The wind turbine farm tolerance range is changed 608 as a function of the wind turbine farm tolerance adjustment signal.

The embodiments described herein provide a control system for a wind turbine and a wind turbine farm. In one embodiment, the wind turbine farm electrical control system as described herein is integrated within existing wind turbine and wind turbine farm hardware and software to measure and control wind turbine voltage and power factor tolerance ranges. More specifically, the control system dynamically determines electrical grid conditions and modifies operational tolerance ranges to facilitate maintaining the wind turbines in the wind turbine farm within predetermined parameters. Alternatively, or in conjunction with the control describe above, an electric grid management entity determines and transmits times and associated tolerance ranges to the wind turbine farm electrical control system. Also, alternatively, or in conjunction with the controls describe above, individual wind turbines within the wind turbine farm receive modified operational tolerance ranges to facilitate maintaining the wind turbine within predetermined parameters. Further, alternatively, or in conjunction with the controls describe above, one or more wind turbines within a wind turbine farm adjust tolerance ranges as a function of time based on agreements between the owners/operators of the grid and the wind turbine farm. The wind turbine farm electrical control system described herein adjusts the voltage and/or power factor tolerance ranges per the commands described above of at least one wind turbine in a wind turbine farm to facilitate more efficient and effective use of electric generation capacity therein. More specifically, the wind turbine farm electrical control system described herein narrows voltage and/or power factor tolerance ranges and commensurately increases electric power and current generation, while maintaining sufficient margins to power and current parameters to accommodate potential large voltage transients in the grid. Therefore, the control system as described herein is to facilitate realizing electric power generation opportunities for the wind farms' owners/operators that may have not been realized with broader voltage and/or power factor tolerance ranges. Moreover, the control system described herein uses existing hardware, such as sensors and processors, therefore, implementation of the embodiments of the wind turbine farm electrical control system as described herein decrease capital costs of construction and operational costs associated with routine preventative and corrective maintenance.

Exemplary embodiments of a wind turbine, a wind turbine farm, a wind turbine farm electrical control system, and a method of controlling a wind turbine and a wind turbine farm are described above in detail. The wind turbine, wind turbine farm, wind turbine farm electrical control system, and method are not limited to the specific embodiments described herein, but rather, components of the wind turbine and/or wind turbine farm and/or the wind turbine farm electrical control system and/or steps of the method may be utilized independently and separately from other components and/or steps described herein. For example, the wind turbine farm electrical control system and method may also be used in combination with other power systems and methods, and are not limited to practice with only the wind turbine and wind turbine farm as described herein. Rather, the exemplary embodiment can be implemented and utilized in connection with many other wind turbine or power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of controlling a wind turbine farm having at least one wind turbine that includes a generator, said method comprising:
   programming at least one algorithm within at least one processor, the at least one algorithm representative of a relationship between at least one electric power grid tolerance range and an electric power generation rating;
   determining an electric power grid tolerance range;
   generating at least one wind turbine farm tolerance adjustment signal representative of a wind turbine farm tolerance range; and,
   changing the wind turbine farm tolerance range.

2. A method in accordance with claim 1, wherein programming at least one algorithm within at least one processor comprises at least one of:
   determining a relationship between a power factor tolerance range and the electric power generation rating; and,
   determining a relationship between a voltage tolerance range and the electric power generation rating.

3. A method in accordance with claim 1, wherein determining the electric power grid tolerance range comprises determining at least one of an electric power grid voltage tolerance range and an electric power grid power factor tolerance range.

4. A method in accordance with claim 1, wherein generating at least one wind turbine farm tolerance adjustment signal representative of a wind turbine farm tolerance range comprises generating at least one of:
   a wind turbine farm voltage tolerance adjustment signal representative of a wind turbine farm voltage tolerance range; and,
   a wind turbine farm power factor tolerance adjustment signal representative of a wind turbine farm power factor tolerance range.

5. A method in accordance with claim 1, wherein generating at least one wind turbine farm tolerance adjustment signal representative of a wind turbine farm tolerance range comprises generating at least one of:
- at least one wind turbine voltage tolerance adjustment signal representative of at least one wind turbine voltage tolerance range; and,
- at least one wind turbine power factor adjustment signal representative of at least one wind turbine power factor tolerance range.

6. A method in accordance with claim 1, wherein generating at least one wind turbine farm tolerance adjustment signal representative of a wind turbine farm tolerance range comprises at least one of:
- generating an electric power generation rating signal representative of at least one wind turbine electric power generation rating; and,
- generating an electric current rating signal representative of at least one wind turbine electric current rating.

7. A method in accordance with claim 1, wherein determining an electric power grid tolerance range comprises at least one of:
- dynamically determining at least one of an electrical grid voltage tolerance range and an electrical grid power factor tolerance range;
- predetermining at least one temporal range and at least one of an associated voltage tolerance range and an associated power factor tolerance range; and,
- receiving at least one of a modified electrical grid voltage tolerance range and a modified electrical grid power factor tolerance range.

8. A method in accordance with claim 1, further comprising increasing at least one of wind turbine electric power generation and wind turbine current generation.

9. A method in accordance with claim 1, further comprising operating at least one transformer tap changer.

10. A wind turbine farm electrical control system comprising:
- at least one wind turbine farm regulating device;
- at least one wind turbine farm control input device; and
- at least one processor operatively coupled with said at least one wind turbine farm regulating device and said at least one wind turbine farm control input device, said at least one processor programmed with at least one algorithm representative of a relationship between at least one electric power grid tolerance range and an electric power generation rating, said at least one processor further programmed to generate at least one wind turbine farm tolerance adjustment signal representative of a wind turbine farm tolerance range.

11. A wind turbine farm electrical control system in accordance with claim 10, further comprising:
- at least one wind turbine controller; and,
- at least one wind farm controller operatively coupled to said at least one wind turbine controller.

12. A wind turbine farm electrical control system in accordance with claim 10, wherein said at least one wind turbine farm control input device comprises at least one of:
- at least one input channel communicatively coupled to an electrical grid command device; and,
- at least one input channel communicatively coupled to an electrical grid monitoring device.

13. A wind turbine farm electrical control system in accordance with claim 12, wherein said at least one input channel communicatively coupled to the electrical grid command device is configured to receive at least one of:
- an electrical grid voltage tolerance range signal; and,
- an electrical grid power factor tolerance range signal.

14. A wind turbine farm electrical control system in accordance with claim 10, wherein said at least one wind turbine farm regulating device comprises at least one of:
- a wind turbine electric power generation regulator;
- a wind turbine farm voltage tolerance regulator;
- a wind turbine farm power factor tolerance regulator;
- at least one wind turbine voltage tolerance regulator; and,
- at least one wind turbine power factor tolerance regulator.

15. A wind turbine farm electrical control system in accordance with claim 10, wherein said at least one wind turbine farm regulating device comprises at least one of:
- at least one wind turbine farm substation transformer tap changer; and,
- at least one wind turbine transformer tap changer.

16. A wind turbine farm, comprising:
- a plurality of wind turbines; and,
- a wind turbine farm electrical control system implemented in each wind turbine of said plurality of wind turbines, said wind turbine farm electrical control system comprising:
  - at least one wind turbine farm regulating device;
  - at least one wind turbine farm control input device; and,
  - at least one processor operatively coupled with said at least one wind turbine farm regulating device and said at least one wind turbine farm control input device, said at least one processor programmed with at least one algorithm representative of a relationship between at least one electric power grid tolerance range and an electric power generation rating, said at least one processor further programmed to generate at least one wind turbine farm tolerance adjustment signal representative of a wind turbine farm tolerance range.

17. A wind turbine farm in accordance with claim 16, further comprising:
- at least one wind turbine controller; and,
- at least one wind farm controller operatively coupled to said at least one wind turbine controller.

18. A wind turbine farm in accordance with claim 16, wherein said at least one wind turbine farm control input device comprises at least one of:
- at least one input channel communicatively coupled to an electrical grid command device; and,
- at least one input channel communicatively coupled to an electrical grid monitoring device.

19. A wind turbine farm in accordance with claim 16, wherein said at least one wind turbine farm regulating device comprises at least one of:
- a wind turbine electric power generation regulator;
- a wind turbine farm voltage tolerance regulator;
- a wind turbine farm power factor tolerance regulator;
- at least one wind turbine voltage tolerance regulator; and,
- at least one wind turbine power factor tolerance regulator.

20. A wind turbine farm in accordance with claim 16, wherein said at least one wind turbine farm regulating device comprises at least one of:
- at least one wind turbine farm substation transformer tap changer; and,
- at least one wind turbine transformer tap changer.

* * * * *